United States Patent [19]

Mosch

[11] Patent Number: 5,718,737
[45] Date of Patent: Feb. 17, 1998

[54] METHOD OF RECYCLING MIXED COLORED CULLET INTO AMBER, GREEN, OR FLINT GLASS

[75] Inventor: Duane A. Mosch, Bridgeton, N.J.

[73] Assignee: International Cullet Exchange. Inc., Bridgeton,, N.J.

[21] Appl. No.: 683,353

[22] Filed: Jul. 18, 1996

Related U.S. Application Data

[63] Continuation of Ser. No. 399,299, Mar. 3, 1995, abandoned.

[51] Int. Cl.$^6$ ..................................................... C03C 15/00
[52] U.S. Cl. ............................ 65/30.1; 65/28; 65/134.3; 65/134.8; 501/27; 501/155
[58] Field of Search ........................ 65/28, 30.1, 134.3, 65/134.8; 501/27, 28, 29, 30, 31, 72, 155

[56] References Cited

U.S. PATENT DOCUMENTS

| | | | |
|---|---|---|---|
| 576,312 | 2/1897 | Hirsch | 501/27 |
| 2,929,675 | 3/1960 | Wranau et al. | 18/54 |
| 2,955,948 | 10/1960 | Silverman | 106/52 |
| 3,003,886 | 10/1961 | Pither | 65/134.3 |
| 3,325,298 | 6/1967 | Brown | 65/134.8 |
| 3,482,955 | 12/1969 | Monks | 65/134 |
| 4,418,014 | 11/1983 | Daniek | 260/125 |
| 4,932,035 | 6/1990 | Pieper | 373/32 |

FOREIGN PATENT DOCUMENTS

| | | | |
|---|---|---|---|
| 53-145822 | 12/1978 | Japan | 501/27 |

OTHER PUBLICATIONS

"Use of Selenium for Decolorizing Glass", The Glass Industry, Sept. 1935, pp. 283–287.

Kirk–Othmer, "Concise Encyclopedia of Chemica Technology", John Wiley & Sons, Inc., 1985, pp. 560–565.

McCreery, P., "Coors'Sorted–Only Policy Affecting Glass Collections in West", *Waste Age's recycling Times* Jan. 24, 1995, p. 16.

Scholes, S.R., Ph.D., "Modern Glass Practice", CBI Publishing Co., Inc., 1975. (See attached pages.).

Springer–Verlag, "Glass Furnaces", 1984 pp. 7–9 and 167–169.

*Primary Examiner*—Peter Chin
*Assistant Examiner*—Michael P. Colaianni
*Attorney, Agent, or Firm*—Woodstock Washburn Kurtz Mackiewicz & Norris LLP

[57] ABSTRACT

Mixed colored cullet glass, which generally contains amounts of green, amber and flint (colorless) glasses, is recycled into amber colored glass by regulating the additive amounts of amounts of iron, carbon, sulfur, and sulfur compounds in the mixture to impart the desired reddish-brown hue. The color green may be selectively decolorized from the mixed colored cullet and the mixed colored cullet may be colorized for the color amber, thereby rendering the decolorized mixed colored cullet substantially amber colored for use in amber colored glass production, such as carbon-sulfur soda lime amber glass. The technique of the invention is also used to produce recycled green or flint glass from unsorted mixed colored cullet glass. The invention is particularly useful in producing amber colored containers or bottles for beverages that require protection from the deteriorating effects of light, such as beer.

26 Claims, No Drawings

5,718,737

METHOD OF RECYCLING MIXED COLORED CULLET INTO AMBER, GREEN, OR FLINT GLASS

CROSS-REFERENCE TO RELATED APPLICATIONS

This application is a continuation of U.S. Pat. application Ser. No. 08/399,299, filed Mar. 3, 1995 now abandoned.

FIELD OF THE INVENTION

The invention relates to the field of glass recycling. The invention more particularly relates to methods and compositions whereby mixed colored cullet glass (i.e., broken pieces of glass of mixed colors and types) can be recycled to make useful glass products. According to a preferred aspect of the invention, mixed colored cullet is admixed with a carbon-sulfur amber colored soda-lime-silica glass batch and therein treated with certain colorizing and/or decolorizing compositions, to produce carbon-sulfur amber colored glass which contains substantial amounts of color converted mixed colored cullet, for use, for example, as beverage bottles for beverages that require protection from the deteriorating effects of light, such as beer.

BACKGROUND OF THE INVENTION

Glass recycling involves collecting used, post-consumer glass and reusing it as a raw material for the manufacture of new glass products. A main repository of recoverable glass is glass containers such as beverage bottles and containers for other products. Bulk recycled post-consumer glass suitable for melting into recycled glass articles is known as cullet. The glass cullet from recycling is generally provided in the form of small pieces of glass.

Recycled containers comprise different colors, especially amber and green, and also colorless or flint glass. There also may be different types of glass in the respective containers, although soda-lime-silica glass, which primarily contains oxides of sodium, calcium and silicon, is the most prevalent. Other waste glass, e.g., off-quality material and scrap from the manufacture of glass products, may also be re-used in the form of comminuted or ground glass cullet.

Approximately ten percent (10%) of municipal refuse is glass, most of which is in the form of discarded containers from beverages, food products and the like. To encourage recycling and minimize waste, there are certain government legislated guidelines to the effect that new glass products should contain a proportion of recycled glass. There is thus a market for cullet that can be re-used readily. Unfortunately, this normally requires that the glass be sorted by color.

Municipal refuse glass is typically collected at the street, processed at a central location and ground into small particles to provide cullet for use in the manufacture of glass products. Processing can involve, for example, color sorting by hand or by optical techniques and removal of non-glass contaminants by hand optical techniques, magnetic, eddy current and metal detecting separation techniques. These techniques are not wholly effective for the separation and color sorting of all of the glass. In sorting, for example, it is possible manually, or mechanically by using a color sensing diverter mechanism, to sort glass by color. However, much of the glass is broken in handling and cannot readily be sorted as whole containers, and sorting of smaller pieces is more difficult. A by-product of glass recycling, even when an attempt is made to sort the glass by color, is a quantity of mixed colored pieces.

The color distribution of the glass in post-consumer solid municipal waste, and accordingly, in typical mixed color cullet, varies regionally. A typical color distribution is approximately 65% flint (colorless), 20% amber, and 15% green. To date, mixed colored cullet has had only limited commercial use, and may be used as an aggregate in paving material, land-fill cover, or some similar use, but often is discarded in landfills. The mixed colored material is substantially less valuable than color sorted cullet.

It would be desirable to develop a process for re-using mixed colored glass, wherein mixed colored cullet can be used like color sorted cullet, to make new and useful glass products. Since sorting is not fully effective, what is needed and provided according to the present invention is a method selectively to colorize and/or decolorize one of the colors in the mixed colored cullet to render it useful in the manufacture of glass products of the other color.

Decolorizing techniques are known in the production of flint glass, especially to remove the tint due to iron impurities, which impurities tend to impart a bluish or greenish hue to "colorless" glass. In the manufacture of colorless glass, particularly soda-lime-silica flint glasses, the presence of iron as an impurity in the raw materials has been a serious problem. The presence of ferrous iron ($Fe^{+2}$) tends to cause a bluish or blue-green discoloration in the finished glass in addition to decreasing its overall brightness. The economics of glass manufacture are such that it is difficult to provide low cost raw materials free from these iron impurities, and most significant deposits of sand and limestone contain at least trace amounts of various iron salts and oxides.

When the raw materials are melted in the glass batch at temperatures of about 2,600° to 2,900° F. (about 1,400° to 1,600° C.), significant amounts of iron present are converted to the ferrous ($Fe^{+2}$) state under the influence of the prevailing equilibrium conditions. Decolorizers and oxidizers can be added to the glass batch in an attempt to oxidize the ferrous ($Fe^{+2}$) iron, thereby forming ferric ($Fe^{+3}$) iron, to minimize this glass coloration. Ferric iron ($Fe^{+3}$) is a relatively much weaker colorant than ferrous iron.

In U.S. Pat. No. 2,929,675 (Wranau, et al.), a method is disclosed for spinning glass fibers using a fluid molten glass, which glass is optically enhanced by decolorizing the glass to make it more transparent or translucent, so that infra-red rays of the radiant heat supply more readily pass through the glass for heating the spinnerette. In the Wranau method, glass which is naturally greenish is decolorized by the addition of effective decolorizing amounts of such materials as selenium oxide, manganese peroxide, copper oxide or dispersed gold to the molten glass.

In U.S. Pat. No. 2,955,948 (Silverman), a glass decolorizing method is disclosed which continuously produces molten color-controlled homogeneous glass. In the Silverman method, flint (colorless) and other container glass is decolorized by addition to the molten glass of a selenium-enriched frit as a decolorizing agent, as opposed to selenium in its free state mixed with virgin batch raw materials. This is considered to better retain the selenium in the finished goods without vapor loss thereof. Silverman discloses that various commonly used materials for decolorizing flint glass have been tried to eliminate selenium vapor losses without success, such as various selenium compounds, e.g., sodium and barium selenates and selenides, as well as arsenic, by reducing the iron oxide inherently present therein. Silverman discloses that the decolorizing agent preferably comprises frit compositions containing the essential decolorizing agent selenium in its $Se^{+4}$ valence state, and also may contain niter and arsenic. In Silverman, the decolorizing agent of selenium-enriched frit is added to the molten flint glass and dispersed therein in order to decolorize the glass.

In U.S. Pat. No. 3,482,955 (Monks), a method is disclosed for decolorizing the ferrous ($Fe^{+2}$) oxide content of soda-lime glass which naturally contains up to about 0.1% by weight of ferrous oxide. The method of Monks continuously produces decolorized homogeneous glass using a manganese-enriched frit glass as the decolorizing agent. Monks, in particular, provides a method of decolorizing soda-lime glass containing iron as the impurity by utilizing a decolorizing frit glass containing manganese that produces no undesirable coloration of its own and adding the decolorizing frit glass to the molten base glass. Monks teaches that decolorizing frit glass preferably comprises oxidized manganese in the $Mn^{+3}$ state ($Mn_2O_3$) and in the $Mn^{+2}$ state (MnO), which acts as an oxidizing agent to oxidize ferrous iron to ferric iron in soda-lime glass.

Decolorizing to minimize the tint caused by trace impurities such as a small proportion of ferrous iron is a less severe problem than decolorizing or offsetting recycled glass that has been heavily tinted by the addition of tint producing compounds, such as chromium green found in high concentrations in green glass. A sufficient treatment with decolorizing compositions may be difficult to achieve without also affecting the clarity of the glass or causing other quality and manufacturing problems.

It is an aspect of the present invention that mixed color cullet such as recycled municipal waste glass containing a mixture of green, amber and flint (colorless) glass, is selectively decolorized and/or colorized to a desired color. Preferably, the mixed colored cullet is converted to recycled amber colored glass for the manufacture of amber glass containers, such as beer and other beverage bottles. In that case the process may include selectively decolorizing for green, and includes the addition of color to achieve an amber tint, thereby minimizing any adverse effect on the appearance of the container due to the relatively dark green color.

In this manner, recycled glass in mixed colors is rehabilitated to provide a material that is substantially as useful for the production of recycled glass containers as sorted amber glass green glass, or flint glass.

SUMMARY OF THE INVENTION

It is an object of the invention to provide a method of producing one color homogeneous glass from mixed colored cullet glasses.

It is still another object of the invention to decolorize the green component glass in mixed color cullet by decolorizing the chromium oxide green component with complementary colored oxides, oxidizing ferrous iron content to ferric iron, and/or reducing the sulfate content with carbon, to produce amber colored glass that can be readily incorporated into conventional glass making equipment for use in the manufacture of amber colored glass articles. Alternatively, the amber colored glass in the unsorted mixed color cullet may be decolorized and/or colorized to produce green colored glass, or the amber colored and green colored glasses may both be decolorized to produce flint glass.

It is still another object of the invention to provide a method of decolorizing the color green from mixed colored cullet glasses to yield amber colored cullet by admixing one or more green decolorizing agents and/or one or more amber colorizing agents with a mixture of virgin glass batch and mixed colored cullet comprising green, amber, and flint glass, to decolorize or offset the green color therefrom and enhance the amber color therein in order to form an amber colored product for use in manufacture of amber colored glasses, such as amber colored beer bottles. A similar technique may be used to produce recycled green or flint colored bottles and the like.

DETAILED DESCRIPTION OF THE PREFERRED EMBODIMENTS OF THE INVENTION

In the method of the invention, a quantity of mixed colored cullet glass is provided. The mixed colored cullet glass is generally reclaimed, post-consumer glass, although the glass producer waste cullet can also be mixed therewith, and typically comprises a mixture of green glass, amber glass and flint (colorless) glass. The mixed colored cullet is primarily made of soda-lime-silica glass (otherwise referred to as "soda-lime glass"). The mixed colored cullet is typically provided in bulk in the form of a plurality of broken pieces or particles produced by crushing or grinding glass containers, the particles typically sized less than 6 mm in diameter, such that the cullet can be readily poured or otherwise handled and melted. According to the invention, at least one color may be selectively removed, neutralized, or converted by selective physical and/or chemical decolorizing, at which time, the mixed colored cullet glass absent such at least one color is recovered for use in the production of new glass products.

In a preferred aspect of the invention, it may be desirable, for example, to produce amber colored glass from the mixed colored cullet. The green glass particles which inherently contain chromium oxide as the green colorant, and which also may contain iron impurities, can be selectively decolorized in the mixed colored batch to remove excessive green which lowers the desired redness ratio or reddish hue in amber glass used to manufacture new containers, such as amber beer bottles. The reddish-brown hue of amber colored glass from mixed colored cullet is controlled by regulating the amounts of iron, carbon and sulfur in the mix to impart the desired reddish-brown amber color. A similar technique may be used to produce recycled green or flint colored bottles and the like.

The method of the invention involves optionally decolorizing the mixed colored cullet glass as to at least one color, by addition to mixed colored glass an effective amount of decolorizing agent(s) as provided hereinafter, for the at least one color to be decolorized. The method includes the step of further colorizing the mixed colored cullet as to at least one remaining color, by addition to the mixed colored glass, an effective amount of colorizing agent(s) as provided hereinafter, to enhance the remaining color. In the method of the invention, it is preferred that a predetermined amount of mixed colored cullet glass is admixed with a virgin batch of glass containing conventional glass raw materials in the remaining color as well as decolorizing agent(s) and colorizing agent(s) to compensate for the mixed colored cullet to produce new glass products containing a certain percentage of recycled mixed colored cullet. This is particularly effective for making amber glass containers and the like from mixed color cullet.

Conventional glass raw materials, such as those for amber, green, or flint soda-lime-silicate glasses, and glass making equipment, such as glass melting furnaces, lehrs, forming equipment and the like, can be used with the method of the invention. For a description of glass raw materials, glass manufacture and processing techniques, reference can be made, inter alia, to S. R. Scholes, Ph.D., *Modern Glass Practice*, CBI Publishing Co., Inc. (1975) and Kirk-Othmer, *Concise Encyclopedia of Chemical Technology*, John Wiley & Sons, Inc. (1985), pp. 560-565, the disclosures of which are hereby incorporated in their entireties.

In a preferred method of the invention amber colored glass used for beverage bottles is produced from the mixed colored cullet. A quantity of mixed colored cullet is intimately mixed together with a virgin batch of conventional glass raw materials used for making amber colored glass, preferably carbon-sulfur amber glass. The minimum amount of post consumer (recycled) cullet in the batch may be affected by government regulations. It is required by some state governments to include at least about 10% or greater, while some state governments require at least about 35% or greater, and, by the year 2000, will require between about 35% and 50% by weight post consumer (recycled) cullet in the glass batch. It is preferred that the mixed colored cullet is introduced on top of a mixed virgin glass batch in the glass melting furnace, typically operated at a temperature of 2,600° to 2,900° F. (about 1,400° to 1,600° C.), to reduce the tendency of the cullet to cause foaming and frothing of the molten virgin batch and resultant processing problems.

The virgin glass raw materials for amber colored glass, known to be capable of yielding glass-forming oxides, can include effective amounts of major constituents, e.g., sand, limestone, soda ash, feldspar, or the like, and minor constituents, e.g., salt cake, gypsum, CARBOCITE™, graphite, iron pyrite, calumite, or the like.

While the precise mechanism is not well understood, the reddish-brown coloration of carbon-sulfur amber colored glass is believed to be attributed to its sulfate (e.g., soda cake and gypsum), carbon (e.g., CARBOCITE™, graphite and carbon black) and iron (e.g., iron oxide and iron pyrite) contents. It is believed that amber glass formation involves the colorizing reactions of the alkali sulfates with reducing agents, such as carbon, to form alkali sulfites, elemental sulfur and sulfides, as well as alkali polysulfides and sulfoferrites, which compounds are all believed to play a part in the amber coloring.

Amber container glasses absorb light in the biologically active region of 450 ηm and thereby protect the container contents from chemically active ultraviolet radiation. Amber (reducing) glass typically has a redox number of about −30 and a redness ratio of greater than two. The composition of a non-limiting, purely representative example of an amber container glass (shown in weight percentages) is provided in Table 1.

TABLE I

Composition of Amber Colored Glass

| Oxide | % (Wt.) |
|---|---|
| $SiO_2$ | 71–73 |
| $Al_2O_3$ | 0.1–0.5 |
| $Fe_2O_3$ | 0.3–0.45 |
| CaO | 7–9 |
| MgO | 0.1–2 |
| $Na_2O$ | 13–15 |
| $K_2O$ | 0–1 |
| MnO | 0–1 |
| $SO_3$ | 0–.5 |

In the method of the invention, the mixed colored cullet is melted into the molten glass batch, forming a homogenous mixture. The green glass contained in the mixed colored cullet, which has relatively high chromium oxide content and which also may contain iron impurities, may be selectively decolorized by the addition of an effective amount of a decolorizing agent to the mixed colored cullet. The decolorizing agent can be a chemical or physical decolorizing agent, or both.

In physical decolorizing, complementary colors are added to the green cullet to offset or neutralize the color green. Preferred physical decolorizing agents include elemental or compounds of selenium (red), manganese (red), cobalt (blue), nickel, and/or selenides. A limitation of color blending, however, is that the glass may be imparted with a grey (smokey) hue in offsetting the greenness in this manner, which may render the glass more translucent and less transparent. For a typical mixed colored cullet comprising about 56% by weight flint (colorless), 22.5% by weight amber, and 21.5% by weight green glass, it is preferred to add from about 0.001 to 0.01% by weight of selenium or comparable decolorizing agent per 100% by weight mixed colored cullet, most preferably between about 0.005 to 0.01% by weight.

Instead of or in addition to physical decolorizing, chemical decolorizing can be effected. Preferred chemical decolorizing agents or oxidizing agents which can be added in effective amounts to the mixed colored cullet to oxidize trace amounts of ferrous (green) to ferric iron include oxides of zinc, cerium, and arsenic, and also can include oxidized virgin batch materials. For a typical mixed colored cullet comprising about 56% by weight flint (colorless), 22.5% by weight amber, and 21.5% by weight green glass, it is preferred to add from about 0.001 to 0.01% by weight of chemical decolorizing agent per 100% by weight mixed colored cullet, most preferably between about 0.005 to 0.05% by weight.

The decolorized or color neutralized green colored cullet and the flint cullet that remain can be color enhanced to amber by adding effective amounts of typical colorizing agents for amber glass production. Preferred colorizing agents include iron pyrite, salt cake (sodium sulfate), sodium sulfite, sodium sulphide, carbon (typically in the form of CARBOCITE™ or graphite), and calumite, which are used to impart a reddish-brown color. For a typical mixed colored cullet comprising about 56% by weight flint (colorless), 22.5% by weight amber, and 21.5% by weight green glass, it is preferred to add from about 0.25 to 0.50% by weight of colorizing agent per 100% by weight mixed colored cullet, most preferably between about 0.30 to 0.40% by weight.

Further in the method of the invention, the molten mixture of mixed colored cullet converted to amber color and virgin amber glass batch can be fined as is well known by the addition of, e.g., salt cake, to minimize gas bubbles therein. After fining, the glass can be directed to a glass blowing machine or other glass forming machine in the same manner as conventionally produced glass, e.g., in a bottle glass blowing machine for forming amber colored beer bottles. After forming, the glass can be annealed in a known manner, e.g., in an lehr, to remove internal glass stresses.

The invention is not limited to the production of amber colored glass from mixed colored cullet. It is also directed to the production of flint or green glass from mixed colored cullet as well. For flint glass, a virgin batch is mixed with chemical decolorizing agents, such as, oxides of cerium and zinc to chemically oxidize iron impurities and may also be mixed with physical decolorizing agents having complementary colors, such as elemental or compounds of selenium and cobalt.

The invention will now further be clarified by a consideration of the following purely exemplary and non-limiting example.

EXAMPLE

Conversion of Mixed Broken Colored Cullet to Amber Colored Glass

A virgin batch of mixed colored cullet was suitably converted to amber colored glass by the following method: First, about 2 lbs. of mixed colored cullet comprising about 56% by weight flint (colorless), 22.5% by weight amber, and 21.5% by weight green glass had from about 0.3 to 0.45% of $Fe_2O_3$ equivalent by weight (based on the weight of the molten cullet) of iron pyrite added therto and intimately mixed together therewith. From about 0.015 to 0.07% by weight carbon (in the form of CARBOCITE™) was also added to the mixed colored cullet to achieve a redox range (i.e., $(Fe^{+2})/(Fe^{+2}+Fe^{+3})$) of about −15.0 to −40.0 which depends upon the furnace atmosphere (i.e., oil, gas or electric). These ingredients were melted to a molten state in a glass furnace at a temperature of about 2,600° F. to 2,700° F. The addition of carbon (reducing agent) controls the final amber color, i.e., as carbon content increases, the reddish-brown hue increases. The molten mixed color cullet with colorizing agents was then cooled and formed into patty samples by pouring the molten cullet from crucibles. The resultant glass was amber colored with a redox number of about −25.0 and a UV transmittance of about 15%.

The invention having been disclosed in connection with the foregoing variations and examples, additional variations will now be apparent to persons skilled in the art. The invention is not intended to be limited to the variations and examples specifically mentioned, and accordingly reference should be made to the appended claims to assess the spirit and scope of the invention in which exclusive rights are claimed.

I claim:

1. A method of creating recycled glass products, comprising the steps of:
    obtaining unsorted mixed color glass cullet having glass of at least two different colors;
    adding to said mixed color glass cullet at least one of a decolorizing agent which selectively decolorizes at least one of the colors of said unsorted mixed color glass cullet and a colorizing agent which enhances a remaining color of said unsorted mixed color glass cullet; and
    melting the mixed color glass cullet and any agent added in said adding step to a molten state;
    creating a recycled glass product of said remaining color from the selectively colorized/decolorized molten mixed color glass cullet.

2. A method as in claim 1, wherein said obtaining step comprises the step of obtaining mixed color cullet comprising flint, green and amber colored glass.

3. A method as in claim 2, wherein said adding step comprises the steps of adding a decolorizing agent which selectively decolorizes said green colored glass and a colorizing agent which colorizes said flint and decolorized green colored glass to amber color.

4. A method as in claim 2, wherein said adding step comprises the steps of adding a decolorizing agent which selectively decolorizes said amber colored glass and a colorizing agent which colorizes said flint and decolorized amber colored glass to green color.

5. A method as in claim 2, wherein said adding step comprises the step of adding a decolorizing agent which selectively decolorizes said amber colored glass and said green colored glass.

6. A method as in claim 1, wherein the decolorizing agent is selected from the group of physical decolorizing agents consisting of manganese, cobalt, nickel and selenides.

7. A method as in claim 1, wherein the decolorizing agent is selected from the group of chemical decolorizing agents consisting of zinc, cerium, and arsenic.

8. A method as in claim 1, wherein the colorizing agent is selected from the group consisting of iron pyrite, salt cake, sodium sulfite, sodium sulphide, CARBOCITE™, calumite, chromium oxide, and iron oxide.

9. A method of creating recycled glass products, comprising the steps of:
    obtaining unsorted mixed color glass cullet having glass of at least two different colors;
    adding an amount of the unsorted mixed color glass cullet to a glass melt of a virgin soda-lime glass batch for glass of a particular color;
    adding to said glass melt at least one of a decolorizing agent which selectively decolorizes at least one of the colors of said unsorted mixed color glass cullet other than said particular color and a colorizing agent which enhances said particular color of said unsorted mixed color glass cullet; and
    creating a recycled glass product of said particular color from the selectively colorized/decolorized glass melt.

10. A method as in claim 9, wherein said virgin glass batch comprises sand, limestone, soda ash, feldspar, salt cake, gypsum, CARBOCITE™, iron pyrite, and calumite.

11. A method as in claim 9, wherein said obtaining step comprises the step of obtaining mixed color cullet comprising flint, green and amber colored glass.

12. A method as in claim 11, wherein the agent adding step comprises the steps of adding a decolorizing agent which selectively decolorizes said green colored glass and a colorizing agent which colorizes said flint and decolorized green colored glass to amber color.

13. A method as in claim 11, wherein the agent adding step comprises the steps of adding a decolorizing agent which selectively decolorizes said amber colored glass and a colorizing agent which colorizes said flint and decolorized amber colored glass to green color.

14. A method as in claim 11, wherein the agent adding step comprises the step of adding a decolorizing agent which selectively decolorizes said amber colored glass and said green colored glass.

15. A method as in claim 9, wherein the decolorizing agent is selected from the group of physical decolorizing agents consisting of manganese, cobalt, nickel, and selenides.

16. A method as in claim 9, wherein the decolorizing agent is selected from the group of chemical decolorizing agents consisting of zinc, cerium, and arsenic.

17. A method as in claim 9, wherein the colorizing agent is selected from the group consisting of iron pyrite, salt cake, sodium sulfite, sodium sulphide, CARBOCITE™, calumite, chromium oxide, and iron oxide.

18. A method of creating recycled glass products, comprising the steps of:
    obtaining unsorted mixed color glass cullet having glass of at least two different colors;
    adding an amount of the unsorted mixed color glass cullet to a raw virgin soda-lime glass batch mixture for glass of a particular color;

adding to said virgin batch mixture at least one of a decolorizing agent which selectively decolorizes at least one of the colors of said unsorted mixed color glass cullet other than said particular color and a colorizing agent which enhances said particular color of said unsorted mixed color glass cullet;

melting the virgin batch mixture with said mixed color glass cullet and any agent added in said adding step to a molten state; and creating a recycled glass product of said particular color from the selectively colorized/decolorized virgin batch mixture.

19. A method as in claim 18, wherein said virgin glass batch comprises sand, limestone, soda ash, feldspar, salt cake, gypsum, CARBOCITE™, iron pyrite, and calumite.

20. A method as in claim 18, wherein said obtaining step comprises the step of obtaining mixed color cullet comprising flint, green and amber colored glass.

21. A method as in claim 20, wherein the agent adding step comprises the steps of adding a decolorizing agent which selectively decolorizes said green colored glass and a colorizing agent which colorizes said flint and decolorized green colored glass to amber color.

22. A method as in claim 20, wherein the agent adding step comprises the steps of adding a decolorizing agent which selectively decolorizes said amber colored glass and a colorizing agent which colorizes said flint and decolorized amber colored glass to green color.

23. A method as in claim 20, wherein the agent adding step comprises the step of adding a decolorizing agent which selectively decolorizes said amber colored glass and said green colored glass.

24. A method as in claim 18, wherein the decolorizing agent is selected from the group of physical decolorizing agents consisting of manganese, cobalt, nickel, and selenides.

25. A method as in claim 18, wherein the decolorizing agent is selected from the group of chemical decolorizing agents consisting of zinc, cerium, and arsenic.

26. A method as in claim 18, wherein the colorizing agent is selected from the group consisting of iron pyrite, salt cake, sodium sulfite, sodium sulphide, CARBOCITE™, calumite, chromium oxide, and iron oxide.

* * * * *

UNITED STATES PATENT AND TRADEMARK OFFICE
CERTIFICATE OF CORRECTION

PATENT NO. : 5,718,737
DATED : February 17, 1998
INVENTOR(S) : Duane A. Mosch

It is certified that error appears in the above-identified patent and that said Letters Patent is hereby corrected as shown below:

Column 7: line 15, change "therto" to --thereto--.

Signed and Sealed this

Thirteenth Day of October 1998

Attest:

Attesting Officer

BRUCE LEHMAN

Commissioner of Patents and Trademarks